(12) United States Patent  (10) Patent No.: US 7,414,192 B2
Johnson  (45) Date of Patent: Aug. 19, 2008

(54) TEMPORARY ATTACHMENT APPARATUS FOR AN ACCESSORY

(75) Inventor: Steven J. Johnson, Galien, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/805,488

(22) Filed: Mar. 22, 2004

(65) Prior Publication Data

US 2005/0205283 A1  Sep. 22, 2005

(51) Int. Cl.
*H01H 9/02* (2006.01)
(52) U.S. Cl. ............................ 174/58; 174/50; 174/135; 248/205.1
(58) Field of Classification Search .................. 174/53, 174/54, 50, 52.1, 480, 57, 58, 17 R, 135, 174/481, 650, 655, 153 G, 153 R, 152 G; 248/68.1, 74.3, 906, 205.1; 220/3.9, 3.2, 220/3.3, 3.8, 4.02; 24/1, 618; 16/2.1, 2.2
See application file for complete search history.

(56) References Cited

U.S. PATENT DOCUMENTS

| 3,733,657 | A | 5/1973 | Lankton |
| 3,905,570 | A | 9/1975 | Nieuwveld |
| 4,806,895 | A | 2/1989 | Petrow |
| 5,104,336 | A * | 4/1992 | Hatanaka et al. ............ 439/404 |
| 5,131,613 | A * | 7/1992 | Kamiya et al. ............. 248/74.3 |
| 5,279,420 | A | 1/1994 | Rodgers |
| RE34,786 | E | 11/1994 | Slough |
| 5,402,971 | A | 4/1995 | Bower |
| 5,463,799 | A | 11/1995 | Graham |
| 5,533,912 | A | 7/1996 | Fillinger |
| 5,665,938 | A | 9/1997 | Boshear |
| 5,673,829 | A | 10/1997 | Hartshorn |
| 5,906,465 | A | 5/1999 | Sato |
| 6,066,805 | A | 5/2000 | Bordwell |
| 6,240,606 | B1 | 6/2001 | Hiroki |
| 6,347,435 | B1 | 2/2002 | Davignon |
| 6,449,808 | B1 | 9/2002 | Zappa |
| 6,536,718 | B2 | 3/2003 | Benito-Navazo |
| 7,176,378 | B1 * | 2/2007 | Johnson ........................ 174/58 |

* cited by examiner

*Primary Examiner*—Angel R Estrada
(74) *Attorney, Agent, or Firm*—Marcus R. Mickney; Mark S. Bicks; Alfred N. Goodman

(57) ABSTRACT

An accessory attachment apparatus for temporarily attaching an accessory to a structure with which the accessory is to be used. The apparatus includes an accessory that is adapted to be received by the structure with which the accessory is to be used, such as an electrical box. A stem having first and second ends extends outwardly from the accessory. The first end of the stem is connected to the accessory. A flexible and resilient head member is connected to the second end of the stem. The flexible head member is adapted to be received by the structure to secure the accessory to the structure.

21 Claims, 6 Drawing Sheets

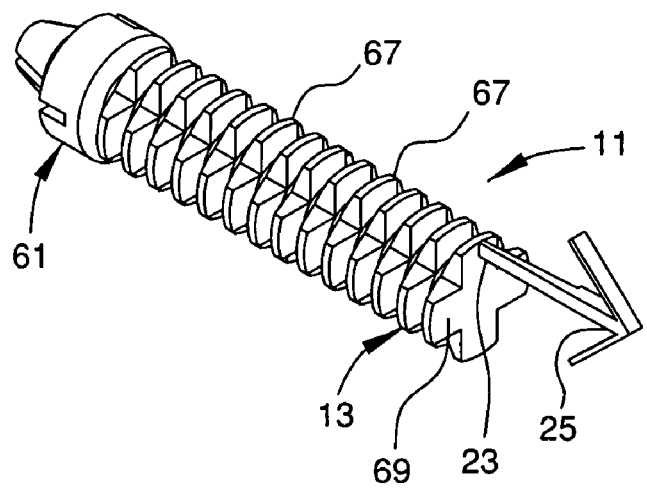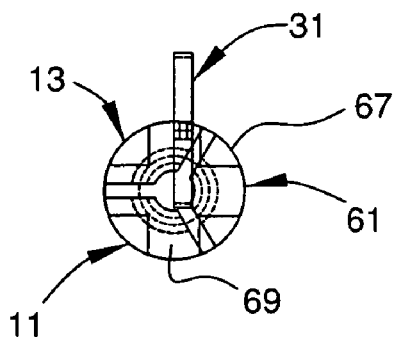
FIG. 5  FIG. 6
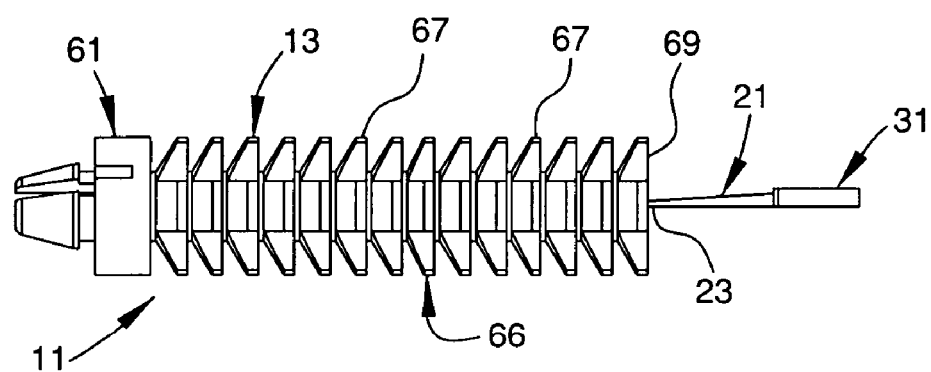
FIG. 7
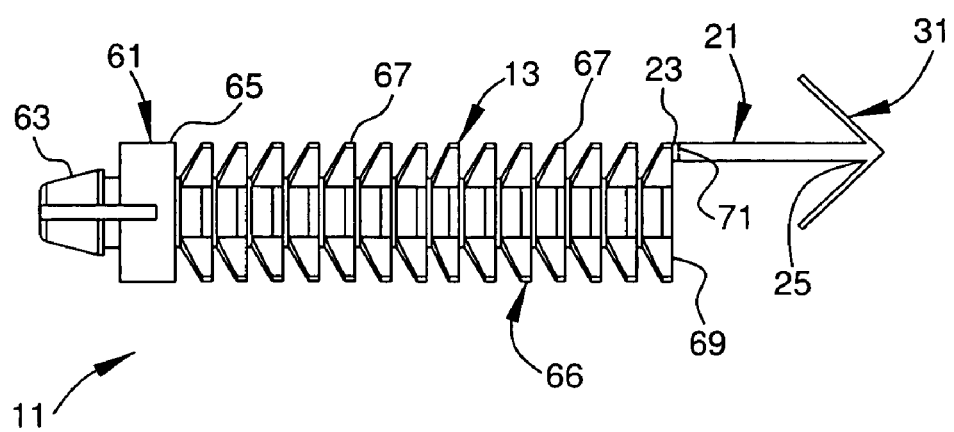
FIG. 8

TEMPORARY ATTACHMENT APPARATUS FOR AN ACCESSORY

FIELD OF THE INVENTION

The present invention relates to an apparatus for temporarily attaching an accessory to a structure with which the accessory is to be used. More particularly, the present invention relates to an apparatus that temporarily attaches an accessory to an electrical box with which the accessory is to be used. Still more particularly, the present invention relates to a method of temporarily securing an accessory to an electrical box. The temporary attachment apparatus may include, for example, a resilient arrowhead frangibly and removably coupled to the accessory.

BACKGROUND OF THE INVENTION

Structures often require accessory components to provide additional benefits or features to a user. For example, electrical boxes require non-metallic cable connectors to facilitate reception of cables, wires and the like by the electrical box. The cable connector is received by an opening in the electrical box. The cable connector has an opening adapted to securely receive cables therethrough. Cables are then passed through the cable connector and into the interior of the electrical box. Other accessories, such as wall supports to stabilize electrical boxes, are available to enhance usage of the electrical box by users.

One problem facing installation of accessories with electrical boxes is loss of the accessory. Installers have difficulties keeping needed accessories with electrical boxes. During large construction projects in which numerous electrical boxes are installed much time is lost by installers having to find accessories to be attached to the electrical boxes as they are installed. This provides for inefficient and costly electrical box installation. A need exists for an apparatus for temporarily attaching an accessory to a structure with which the accessory is to be used.

Another problem facing installers is matching desired accessories with designated electrical boxes. Electrical boxes and accessories are ordered separately and it is an inefficient and time consuming endeavor for an installer to match the accessories with the electrical boxes. A need exists for temporarily attaching an accessory to a structure with which the accessory is to be used so that the structure can be shipped with the accessory temporarily attached.

This problem is further complicated when installers take accessories from the existing inventory to replace accessories that have been lost, thereby creating a shortage of accessories. This results in delayed installation as additional accessories must be ordered to replenish the depleted inventory. A need exists for an apparatus for temporarily attaching an accessory to a structure with which the accessory is to be used to prevent loss of the accessory.

Examples of existing fastening devices are disclosed in the following U.S. Pat. No. 5,279,420 to Rodgers; U.S. Pat. No. 5,463,799 to Graham; U.S. Pat. No. 6,240,606 to Hiroki; U.S. Pat. No. 6,347,435 to Davignon et al.; and U.S. Pat. No. 6,449,808 to Zappa et al.

Thus, there is a continuing need to provide an improved accessory attachment apparatus.

SUMMARY OF THE INVENTION

Accordingly, it is a primary objective of the present invention to provide an improved accessory attachment apparatus.

A further objective of the present invention is to provide an improved apparatus for temporarily attaching an accessory to a structure with which the accessory is to be used.

A further objective of the present invention is to provide a non-metallic accessory attachment apparatus for temporarily securing the non-metallic accessory to an electrical box with which the accessory is to be used.

A still further objective of the present invention is to provide a method of temporarily attaching an accessory to an electrical box with which the accessory is to be used.

The foregoing objects are basically attained by providing an accessory attachment apparatus for temporarily attaching an accessory to a structure with which the accessory is to be used. The apparatus includes an accessory that is adapted to be received by the structure with which it is to be used, such as an electrical box. A stem having first and second ends extends outwardly from the accessory. The first end of the stem is connected to the accessory. A flexible and resilient head member is connected to the second end of the stem. The flexible head member is adapted to be received by the structure to temporarily secure the accessory to the device.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure:

FIG. 5 is a perspective view of a non-metallic accessory temporary attachment apparatus according to another embodiment of the invention;

FIG. 6 is a rear elevational view of the non-metallic accessory temporary attachment apparatus of FIG. 5;

FIG. 7 is top plan view of the non-metallic accessory temporary attachment apparatus of FIG. 5;

FIG. 8 is a side elevational view of the non-metallic accessory temporary attachment apparatus of FIG. 5;

DETAILED DESCRIPTION OF THE INVENTION

Figure 9:
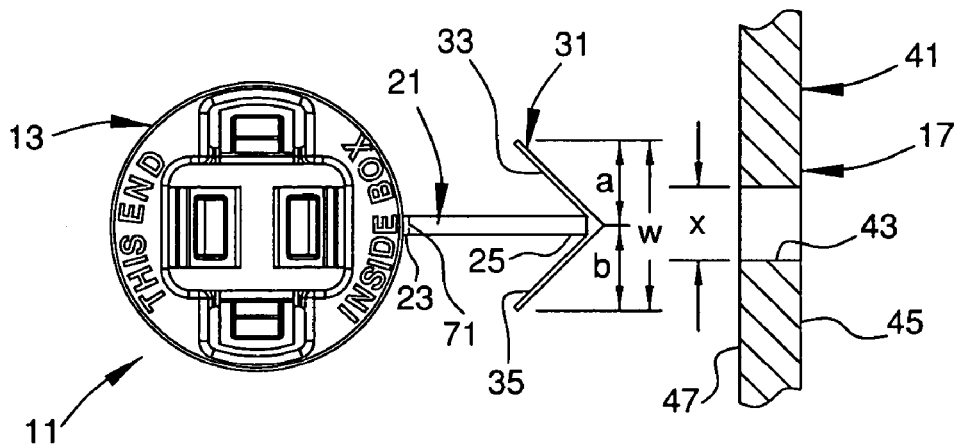
FIG. 9 is a side elevational view in partial cross section of a non-metallic accessory temporary attachment apparatus prior to being inserted in an opening of an electrical box.
Figure 10:
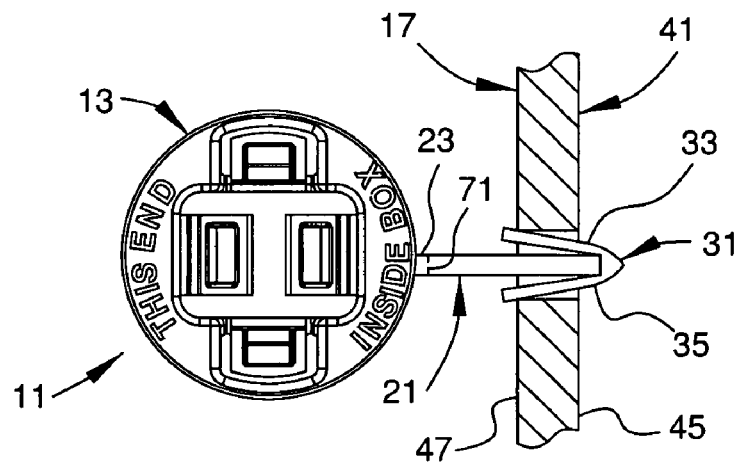
FIG. 10 is a side elevational view in partial cross section of the non-metallic accessory temporary attachment apparatus being inserted through the opening in the electrical box.
Figure 11:
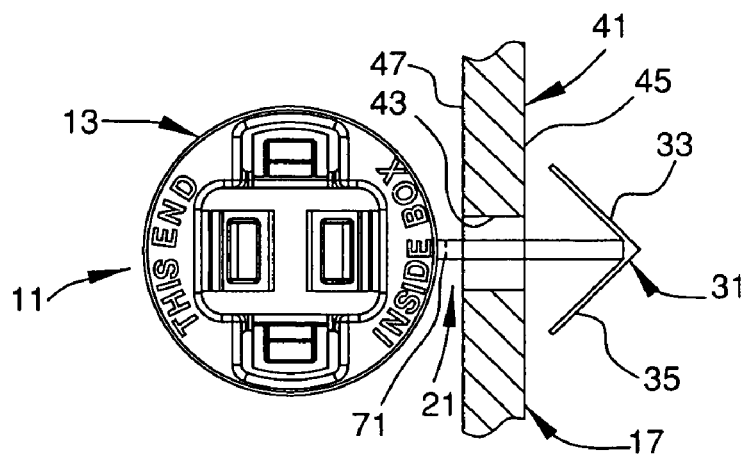
FIG. 11 is a side elevational view in partial cross section of the non-metallic accessory temporary attachment apparatus after being inserted through the opening in the electrical box.
Figure 12:
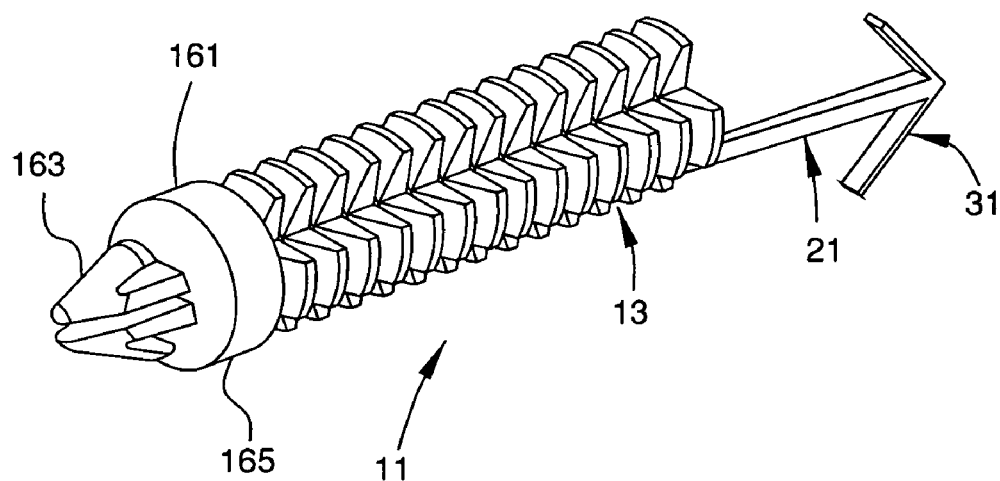
FIG. 12 is a perspective view of a non-metallic accessory temporary attachment apparatus according to the present invention, in which the accessory is a far-side box support.
Figure 13:
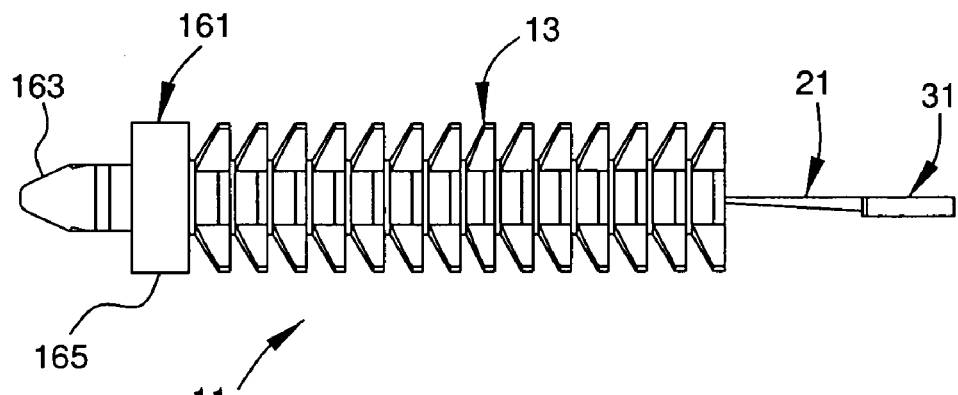
FIG. 13 is side elevational view of the non-metallic accessory temporary attachment apparatus of FIG. 12.
Figure 14:
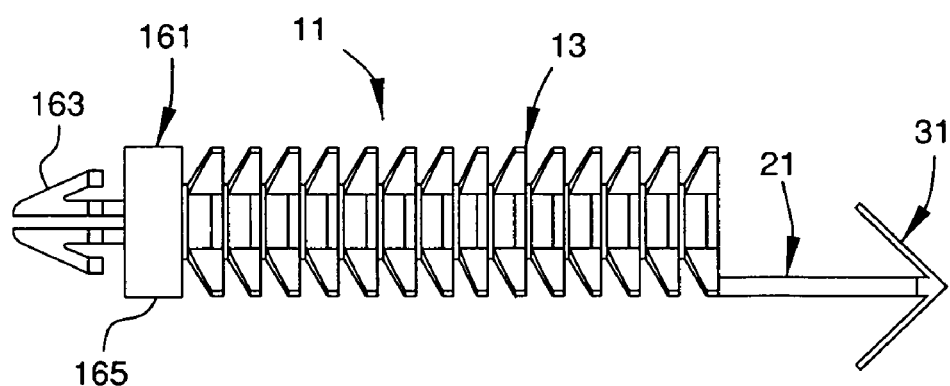
FIG. 14 is top plan view of the non-metallic accessory temporary attachment apparatus of FIG. 12.
Figure 15:
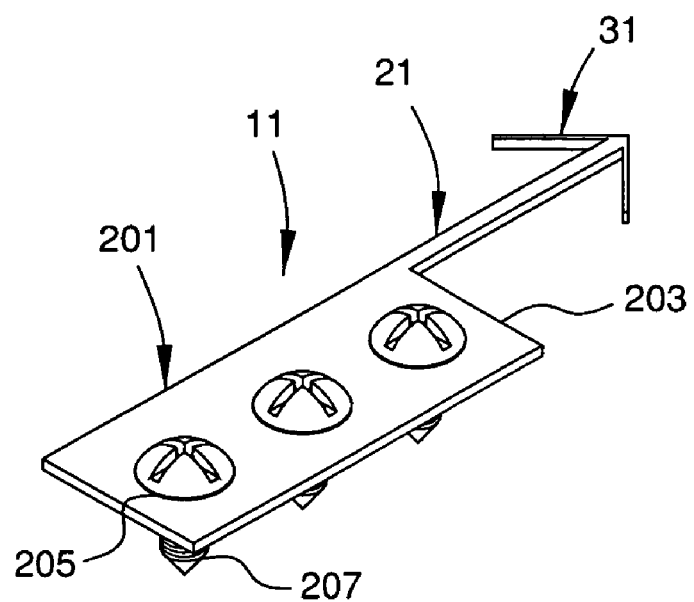
FIG. 15 is a perspective view of a non-metallic accessory temporary attachment apparatus according to the present invention, in which the accessory is a plate that holds fasteners to be used for installation of the electrical box.
Figure 16:
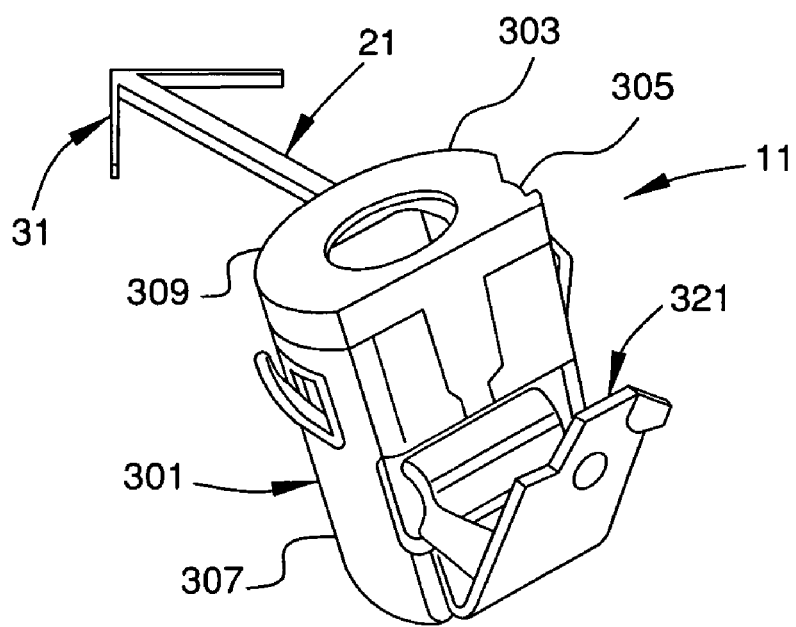
FIG. 16 is a perspective view of a metallic accessory temporary attachment apparatus according to the present invention, in which the accessory is a metallic conduit connector adapted to be received in an opening in the electrical box.
Figure 17:
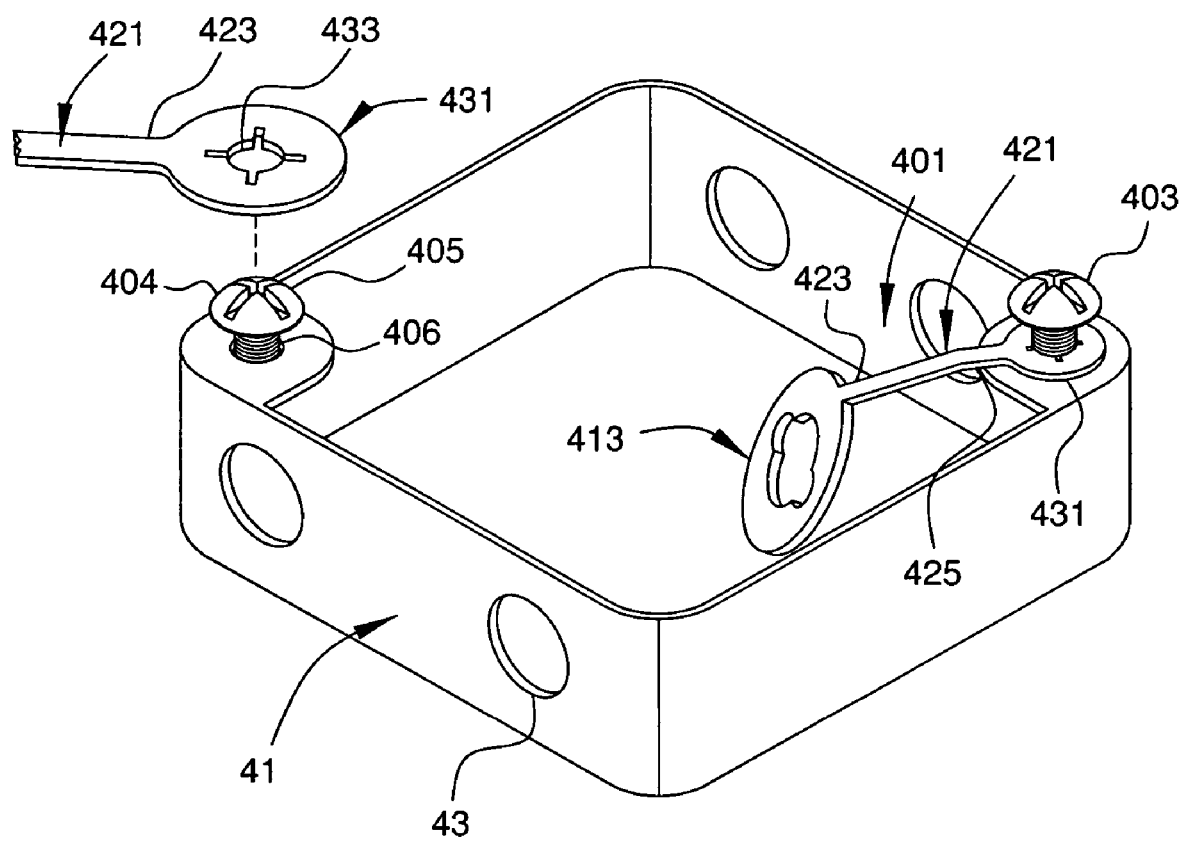
FIG. 17 is a perspective view of another embodiment of the present invention in which the flexible head member has an opening adapted to be received by a fastener on the electrical box.

As shown in FIGS. 1-17, the present invention relates to an apparatus 11 for temporarily attaching an accessory 13 to a structure 41 with which the accessory is to be used. FIGS. 1-4 show a first embodiment of the present invention in which the accessory is a non-metallic cable connector 51 for use with an electrical box 41. FIGS. 5-8 show a second embodiment of the present invention in which the accessory is a non-metallic box support 61 for use with an electrical box 41. FIGS. 9-11 show an accessory 13 being temporarily secured to a structure 41. FIGS. 12-14 show another embodiment of the present invention in which the accessory is a non-metallic box support having a different head member. FIG. 15 shows another embodiment of the present invention in which the accessory is a non-metallic plate that holds fasteners to be used to install the electrical box. FIG. 16 shows another embodiment of the present invention in which the accessory is a metallic conduit connector adapted to be received in an opening in the electrical box. FIG. 17 shows another embodiment of the present invention in which the flexible head member has an opening adapted to be received by the support. The attachment apparatus 11 includes an accessory 13 that is adapted to be received by the structure 41 with which it is to be used, such as an electrical box, or a bracket or fastener secured to the electrical box. A stem 21 having a first end 23 and a second end 25 extends outwardly from the accessory 13. The first end 23 of the stem 21 is connected to the accessory 13. A flexible and resilient head member 31 is connected to the second end 25 of the stem 21. The flexible and resilient head member 31 is adapted to be received by the structure 41 to temporarily secure the accessory 13 to the structure.

Figure 1:
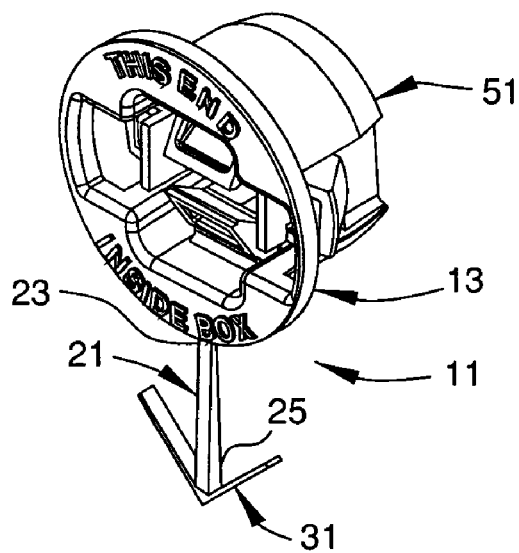
FIG. 1 is a perspective view of a non-metallic accessory temporary attachment apparatus according to the present invention.
Figure 2:
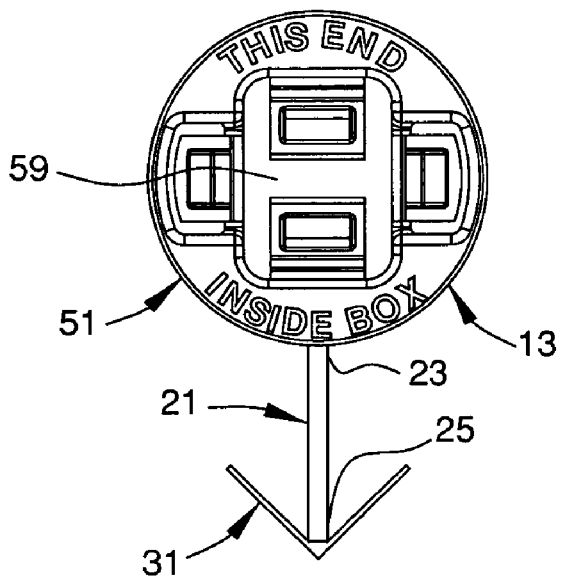
FIG. 2 is a front elevational view of the non-metallic accessory temporary attachment apparatus of FIG. 1.
Figure 3:
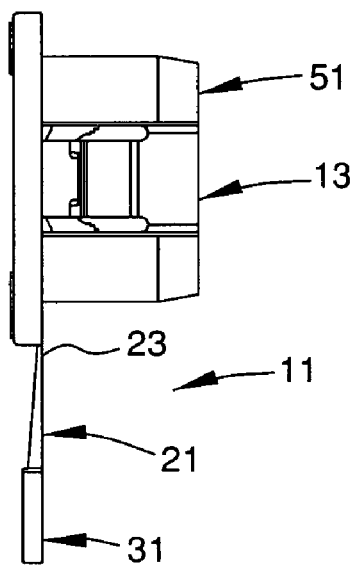
FIG. 3 is a side elevational view of the non-metallic accessory temporary attachment apparatus of FIG. 2.

The accessory attachment apparatus 11 includes a stem 21 connecting the accessory 13 to the flexible head member 31, as shown in FIGS. 1, 5 and 9. The stem 21 has a first end 23 that is connected to the accessory 13. The stem 21 extends outwardly from the accessory 13. Preferably, the stem 21 extends substantially perpendicularly from the accessory 13. The stem 21 has a second end 25 that is connected to the flexible head member 31.

The flexible head member 31 secures the accessory 13 to a support 17, as shown in FIG. 11. The flexible head member 31 is secured to the second end 25 of the stem 21. Preferably, the head member 31 is substantially V-shaped, such as an arrowhead, as shown in FIGS. 1, 2, 5 and 8-11. The substantially V-shaped head member has a first leg 33 and a second leg 35. The first and second legs 33 and 35 extend from the second end 25 of the stem 21 toward the accessory 13. The first and second legs 33 and 35 are flexible and resilient so that they may be pressed inwardly against the stem 21 to easily fit through an opening in a support 17, as shown in FIG. 10, and then expand outwardly under their natural resiliency to a position larger than the size of the opening, which prevents their easy removal, as shown in FIG. 11.

A score line 71, as shown in FIGS. 8-11, may be made in the stem 21 to provide for easy separation of the accessory 13 from the stem 21, thereby frangibly and removably coupling the accessory to the accessory attachment apparatus 11. Any other suitable means of detachment may be used instead of a score line, such as weakening the stem an the desired point of separation. Alternatively, the stem 21 may be simply cut with scissors or shears to separate the accessory 13 from the stem.

Figure 4:
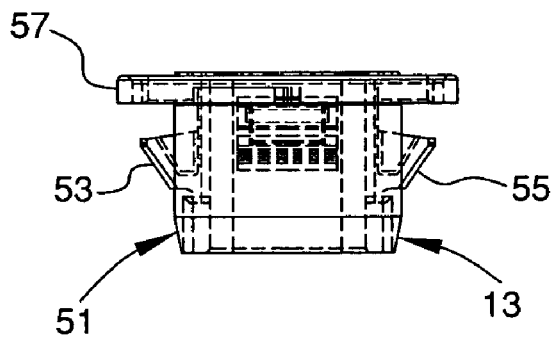
FIG. 4 is a top plan view of the non-metallic accessory temporary attachment apparatus of FIG. 1.

The accessory 13 may be any accessory suitable for use with the support 17 to which the accessory is attached. As shown in FIGS. 1-4, the accessory 13 is a non-metallic cable connector 51 for use with an electrical box 41 (FIG. 9). The cable connector 51 has tabs 53 and 55 and a flange 57, as shown in FIG. 4, between which the electrical box is secured when the connector 51 is inserted through an opening in the electrical box 17. Cables, wires and the like may then be passed through the opening 59 in the cable connector 51 and into the electrical box 41.

The accessory 13 may be a box support 61 for stabilizing the electrical box 41, as shown in FIGS. 5-8. The head 63 of the box support 61 is inserted through an opening in an electrical box until the box is securely held between the head 63 and the flange 65 of the box support. A tail 66 extends outwardly from the flange 65. The tail 66 includes a plurality of ribs 67. Each rib 67 has a planar surface 69 for abutting a wall proximal the electrical box. The head 63 of the box support 61 is received by the electrical box 41 and the planar surface 69 of a rib 67 abuts the wall, thereby stabilizing the electrical box 41. The tail 66 may be easily separated at any point to accommodate the distance between the electrical box and the wall.

The accessory 13 may be a different box support 161 for stabilizing the electrical box, as shown in FIGS. 12-14. The box support 161 has a head member 163 that is inserted through an opening in an electrical box until the box is securely held between the head member head and the flange 165 of the box support. The features of the box support 161 are described in more detail in U.S. Pat. No. Re. 34,786 to Slough, which is hereby incorporated by reference in its entirety.

The accessory may be a fastener retainer 201, as shown in FIG. 15. The fastener retainer 201 includes a non-metallic plate 203 having at least one hole 205 for receiving a fastener 207. The flexible and resilient head member 31 of the accessory attachment apparatus 11 is adapted to be received by an electrical box to temporarily secure the fastener retainer 201 to the electrical box. When the electrical box is to be installed, fasteners 207 are easily removed from the plate 205 to secure the electrical box to a support. The fastener retainer 201 ensures that fasteners are readily available to the installer when required for installation of the electrical box.

The accessory may be a connector 301 adapted to secure a metallic conduit or a metal clad connector to an electrical box, as shown in FIG. 16. The connector 301 includes a non-metallic sleeve 303 that is received by an aperture 305 in a body 307. The stem 21 of the accessory attachment apparatus 11 is connected to sleeve 303, which is preferably non-metallic. Preferably, the body 307 of the connector 301 is metallic. The stem 21 may be connected to a first end 309 of the sleeve 303 and a lever arm 321 may be connected to a second and opposite end of the body 307. The lever arm 321 facilitates insertion of the connector 301 into a knockout of an electrical box and reception of cables.

In another embodiment of the present invention, an attachment apparatus 401 includes an accessory 413 that is adapted to be received by the structure 41 with which it is to be used, such as an electrical box 41, or a bracket or fasteners 403 and 404 secured to the electrical box. A stem 421 having a first end 423 and a second end 425 extends outwardly from the accessory 413. The first end 423 of the stem 421 is connected to the accessory 413. A flexible and resilient head member 431 is connected to the second end 425 of the stem 421. The flexible and resilient head member 431 is adapted to be received by a fastener 403 and 404 secured to the electrical box 41, as shown in FIG. 17, to temporarily secure the accessory 413 to the structure. The flexible and resilient head member 431 has an opening 433 that is adapted to receive a fastener. The opening 433 flexes to receive the fastener head 405. The resiliency of the head member 431 causes the opening to return to its original shape and secure the head member to the shaft 406 of the fastener. The connector 413 is adapted to be received by an opening 43, or knockout, in the electrical box 41.

Preferably, the accessory 13, the stem 21 and the flexible head member 31 are unitarily formed. Preferably, the attachment apparatus is made of a non-metallic material.

Assembly and Disassembly

As shown in FIGS. 1-17, the accessory attachment apparatus 11 is fully constructed. The method of temporarily attaching the accessory 13 to a support 17 is shown in FIGS. 9-11. FIG. 9 shows the accessory attachment apparatus 11 prior to attaching the accessory attachment apparatus to the support 17 and after removing the accessory attachment apparatus from the support. FIG. 10 shows the apparatus 11 as the flexible head member 31 is passing through an opening 43 in the electrical box 41. FIG. 11 shows the accessory attachment apparatus 11 after the flexible head member 31 has passed through the opening 43 in the electrical box 41, thereby temporarily attaching the accessory 13 to the electrical box.

An accessory attachment apparatus 11 is shown in FIG. 9 just before inserting the apparatus through an opening 43 in an electrical box 41. The width "w" of the flexible head assembly 31 in a first position is larger than the width "x" of the electrical box opening 43. The widths "a" and "b" correspond to the distance between the stem 21 and each end of legs 31 and 35, respectively, of the flexible head member 31. Each of widths "a" and "b" is larger than the width "x" to prevent accidental removal of the flexible head member 31 from the electrical box opening 43. The opening 43 extends from the outer surface 47 of the electrical box 41 to the inner surface 45. The "a' and "b" widths are measured from a longitudinal axis of the stem 21 to each of the free ends of the first and second legs 31 and 35, as shown in FIG. 9.

The accessory 13 is temporarily attached to the electrical box 41 by passing the flexible head member 31 through the opening 43 in the electrical box, as shown in FIG. 10. The flexible head member 31 may be passed through the opening 43 in the electrical box 41 from either inside or outside the box. The flexible head member 31 is compressed to pass the flexible head member through the opening 43 in the electrical box 41. The flexible head member may be compressed by manually depressing the legs 33 and 35 of the head member toward the stem so that the width of the head member is less than or equal to the width of the electrical box opening, and then passing the flexible head member through the electrical box opening. Alternatively, if the flexible head member 31 is substantially V-shaped, the electrical box compresses the legs 33 and 35 of the head member 31 as it passes through the electrical box opening 43.

Once the flexible head member 31 has passed through the electrical box opening 43, the flexible head member expands and return to its original shape, as shown in FIG. 11. The flexible head member 31 again has a width that is larger than the width of the electrical box opening 43 to prevent acciden- tal removal of the flexible head member 31 from the electrical box opening 43. The legs 33 and 35 of the flexible head member 31 bear against the inner wall 45 to prevent pulling the flexible head member back through the electrical box opening 43.

The accessory attachment apparatus 11 may be attached to the electrical box 41 prior to shipping the electrical box to customers. All accessories desired by the customer may then be attached to the electrical box to provide for quick and easy installation once received by the customer, and to prevent the customer from losing the accessories. Alternatively, the customer may attach the accessory attachment apparatus to the electrical box to prevent loss of any accessories to be used with that particular electrical box once installed.

The stem 21 may have a score line 71, or any other suitable means of separation, to facilitate removal of the accessory 13 from the stem 21. The accessory 13 may also be separated by simply cutting the stem with scissors, shears or a similar cutting device. Once the accessory 13 is removed from the stem it may be used as required with the electrical box 41 to which it was previously temporarily attached.

While advantageous embodiments have been chosen to illustrate the invention, it will be understood by those skilled in the art that various changes and modifications may be made therein without departing from the scope of the invention as defined in the appended claims.

What is claimed is:

1. An accessory attachment apparatus, comprising:
   an accessory adapted to be received by a support, said accessory being a cable connector or an electrical box stabilizing support;
   a stem having first and second ends extending outwardly from said accessory, said first end of said stem being removably and directly connected to said accessory; and
   a flexible head member connected to said second end of said stem, said head member being adapted to be received by the support to secure the accessory to the support, and no flexible head members being disposed along the stem between the first and second ends thereof,
   wherein said accessory is receivable by the support after separating said accessory and said stem.

2. An accessory attachment apparatus according to claim 1, wherein
   said accessory, stem and flexible head member are unitarily formed.

3. An accessory attachment apparatus according to claim 1, wherein
   said accessory, stem and flexible head member are made of a non-metallic material.

4. An accessory attachment apparatus according to claim 1, wherein
   said head member is substantially V-shaped.

5. An accessory attachment apparatus according to claim 4, wherein
   said V-shaped head member has first and second legs extending from said second end of said stem toward said accessory.

6. An accessory attachment apparatus according to claim 1, wherein
   said stem is removable from said accessory proximal said first end of said stem.

7. An accessory attachment apparatus according to claim 6, wherein
   said head member has first and second widths from a longitudinal axis of said stem to each free end of said first and second legs that are larger than a third width of an opening in the electrical box that receives said head member to prevent said head member from being accidentally withdrawn from the electrical box opening.

8. An accessory attachment apparatus according to claim 1, wherein
said stem has a score line to facilitate removal of said stem from said accessory.

9. An accessory attachment apparatus according to claim 1, wherein
said head member has a first width larger than a second width of an opening in the electrical box that receives said head member to prevent said head member from being accidentally withdrawn from the electrical box opening.

10. An accessory attachment apparatus according to claim 1, wherein
said flexible head member is adapted to be received by an opening in the electrical box.

11. An accessory attachment apparatus according to claim 1, wherein
said cable connector is a metallic cable connector.

12. An accessory attachment apparatus, comprising:
an electrical box having an opening having a width;
an accessory adapted to be received by said electrical box, said accessory being a cable connector or an electrical box stabilizing support;
a stem having first and second ends extending outwardly from said accessory, said first end of said stem being removably and directly connected to said accessory; and
a resilient head member connected to said second end of said stem, said head member having a first width larger than said second width of said electrical box opening, wherein said resilient head member is inserted through said electrical box opening and said first width of said head member being larger than said second width of said electrical box opening to prevent said resilient head member from accidentally being removed from said electrical box, and no resilient head members being disposed along the stem between first and second ends thereof,
wherein said accessory is receivable by the support after separating said accessory and said stem.

13. An accessory attachment apparatus according to claim 12, wherein
said accessory, stem and flexible head member are unitarily formed.

14. An accessory attachment apparatus according to claim 12, wherein
said accessory, stem and flexible head member are made of a non-metallic material.

15. An accessory attachment apparatus according to claim 12, wherein
said head member is substantially V-shaped.

16. An accessory attachment apparatus according to claim 15, wherein
said V-shaped head member has first and second resilient legs extending from said second end of said stem toward said accessory.

17. An accessory attachment apparatus according to claim 16, wherein
said head member has third and fourth widths from a longitudinal axis of said stem to each free end of said first and second legs that are larger than the second width of an opening in the electrical box that receives said head member to prevent said head member from being accidentally withdrawn from the electrical box opening.

18. An accessory attachment apparatus according to claim 12, wherein
said stem is removable from said accessory proximal said first end of said stem.

19. An accessory attachment apparatus according to claim 12, wherein
said stem has a score line to facilitate removal of said stem from said accessory.

20. An accessory attachment apparatus according to claim 12, wherein
said cable connector is a metallic cable connector.

21. An accessory attachment apparatus according to claim 12, wherein
said flexible head member is adapted to be received by an opening in the electrical box.

* * * * *